United States Patent [19]

Winston

[11] Patent Number: 4,673,023
[45] Date of Patent: Jun. 16, 1987

[54] MULTIPART LOST FOAM PATTERN AND METHOD OF MAKING SAME

[75] Inventor: John H. Winston, Menomonee Falls, Wis.

[73] Assignee: Outboard Marine Corporation, Waukegan, Ill.

[21] Appl. No.: 681,960

[22] Filed: Dec. 14, 1984

[51] Int. Cl.⁴ .............................................. B22C 7/02
[52] U.S. Cl. .................................... 164/246; 164/34; 164/45
[58] Field of Search ................................. 164/34–36, 164/246, 45

[56] References Cited

U.S. PATENT DOCUMENTS

| | | | |
|---|---|---|---|
| 2,468,479 | 4/1949 | Barishman | 164/244 |
| 2,508,546 | 5/1950 | Skinner | 164/246 |
| 3,094,751 | 6/1963 | Horton | 164/36 |
| 3,254,379 | 6/1966 | Poe | 164/242 |
| 3,635,280 | 1/1972 | Parsons | 164/246 |
| 3,695,340 | 10/1972 | Gross | 164/246 |
| 3,707,029 | 12/1972 | Parsons | 29/407 |
| 3,835,913 | 10/1974 | Vandermark et al. | 164/34 |
| 3,848,654 | 11/1974 | Boyle et al. | 164/34 |
| 4,161,208 | 7/1979 | Cooper | 164/246 X |
| 4,172,867 | 10/1979 | Devault | 164/35 X |

OTHER PUBLICATIONS

Mechanical Engineers' Handbook, edited by Lionel S. Marks, 5th Ed., 1951, pp. 223, 224.

Primary Examiner—Nicholas P. Godici
Assistant Examiner—J. Reed Batten, Jr.
Attorney, Agent, or Firm—Michael, Best & Friedrich

[57] ABSTRACT

A lost foam pattern including a first lost foam piece having a tapered inner surface defining an indentation, and a second lost foam piece received in the indentation and having a tapered outer surface in frictional engagement with the tapered inner surface, the first lost foam piece and second lost foam piece being fixedly connected solely by virtue of the frictional engagement.

13 Claims, 5 Drawing Figures

U.S. Patent  Jun. 16, 1987  4,673,023
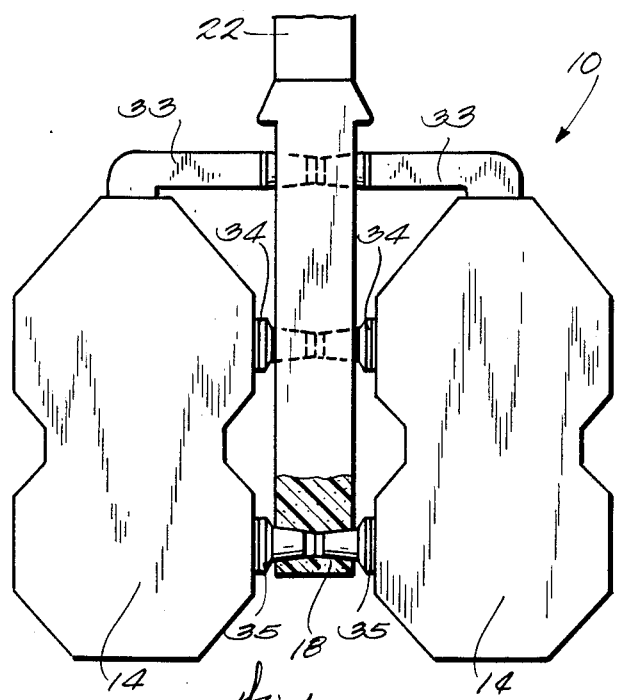
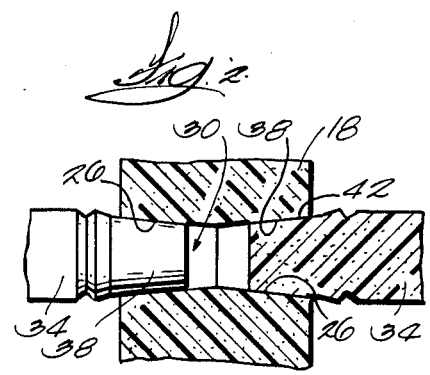
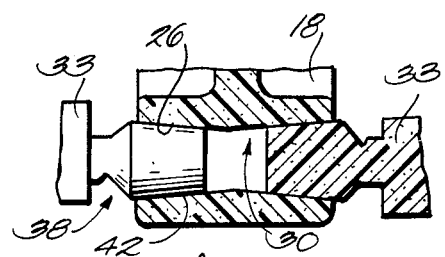
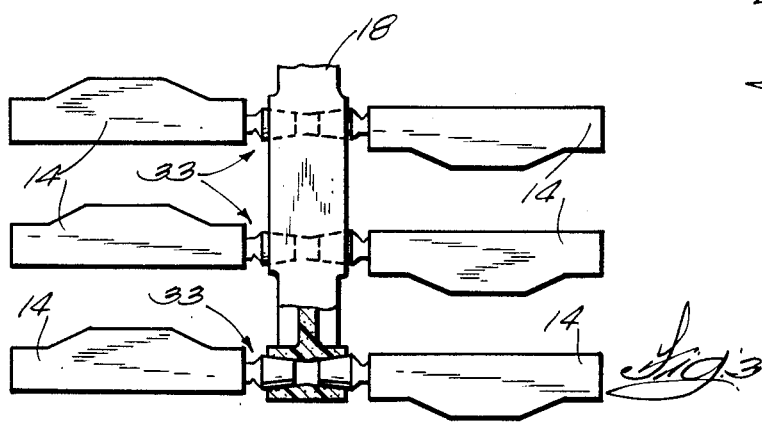
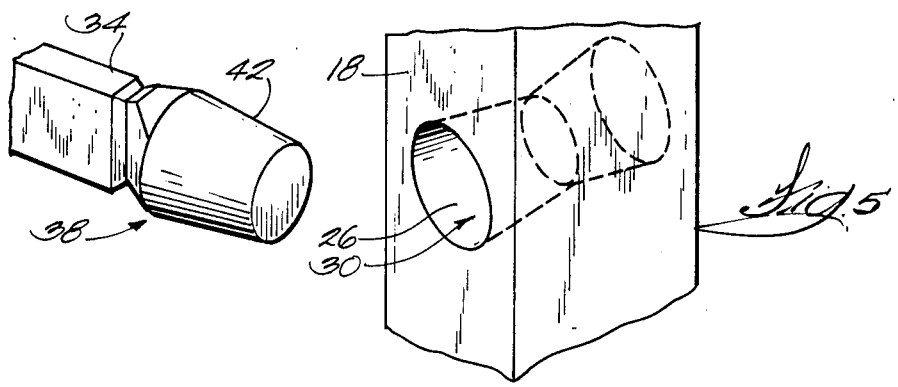

MULTIPART LOST FOAM PATTERN AND METHOD OF MAKING SAME

BACKGROUND OF THE INVENTION

This invention relates to lost foam patterns used in casting metal components and methods for assembling such patterns.

Lost foam patterns are generally attached to a runner which is then attached to a sprue to form a cluster of patterns. This attachment has been accomplished by hot melt adhesives, by a hot knife which welds two polystyrene surfaces together, or by solvent bonding using a material such as methylene chloride. These methods can be slow and hazardous. Further, the latter two methods do not lend themselves easily to small lot assembly. Also, highly stressed joints assembled with hot melt adhesives are prone to failure when the patterns are covered with a ceramic slurry coating and then dried quickly at elevated temperatures.

Attention is directed to the following U.S. patents which illustrate casting patterns:

| Patentee | U.S. Pat. No. | Issued |
| --- | --- | --- |
| Barishman | 2,468,479 | April 26, 1949 |
| Skinner | 2,508,546 | May 23, 1950 |
| Poe | 3,254,379 | June 7, 1966 |
| Parsons | 3,635,280 | January 18, 1972 |
| Parsons | 3,707,029 | December 26, 1972 |
| Boyle et al. | 3,848,654 | November 19, 1974 |

Attention is also directed to Gross U.S. Pat. No. 3,695,340, issued Oct. 3, 1972, which illustrates a polystyrene casting pattern. The pattern includes a first piece fixedly located in a reverse tapered groove in a second piece by a compressed and then restored tongue thickness sufficient to hold the tongue in the groove. The tongue is not held in the groove solely by virtue of frictional engagement between the tongue and the second piece.

SUMMARY OF THE INVENTION

This invention provides a lost foam pattern including a first lost foam piece having a tapered inner surface defining a recess or identation, and a second lost foam piece received in the indentation and having a tapered outer surface in frictional engagement with the tapered inner surface. The first lost foam piece and second lost foam piece are fixedly connected solely by virtue of the frictional engagement.

In one embodiment, the tapered inner surface and the tapered outer surface each have about a five degree taper and are generally conical.

This invention also provides a lost foam pattern cluster including a runner having a plurality of tapered inner surfaces, each tapered inner surface defining a recess or indentation, and a like plurality of lost foam patterns. Each pattern includes a portion received in one of the indentations and having a tapered outer surface in frictional engagement with the associated one of the tapered inner surfaces. The runner and the patterns are fixedly connected solely by virtue of the frictional engagement.

This invention also provides a method for assembling a lost foam pattern, the method comprising forcing a second lost foam piece having a tapered outer surface into a first lost foam piece having a tapered inner surface defining a recess or indentation to the point where the tapered outer surface is in frictional engagement with the tapered inner surface and the first lost foam piece and the second lost foam piece are fixedly connected solely by virtue of the friction engagement.

One of the principal features of the invention is that the method described and the pattern or cluster produced includes a joint which has a uniform stress around the joint surfaces, thereby effectively sealing the joint to prevent any casting flaws.

Another of the principal features of the invention is the provision of a lost foam pattern which can be assembled without the use of glues, solvents or hot knives, and the problems associated therewith. Further, no fixturing is required. Accordingly, the time required to assemble the pattern is less than when other assembly methods are used.

Another of the principal features of the invention is the provision of a lost foam pattern including a joint which remains strong when elevated temperatures are used for drying ceramic slurry coatings on the pattern.

Other features and advantages of embodiments of the invention will become apparent upon reviewing the following drawings, the detailed description and the appended claims.

BRIEF DESCRIPTION OF THE DRAWINGS

FIG. 1 is a end view, partially broken away, of a lost foam pattern cluster which embodies various of the features of the invention.

FIG. 2 is an enlargement of one of the joints which is shown in FIG. 1 and which embodies various of the features of the invention.

FIG. 3 is a top view of the lost foam pattern cluster shown in FIG. 1.

FIG. 4 is an enlargement of another joint which is shown in FIG. 3 and which embodies various of the features of the invention.

FIG. 5 is a disassembled exploded view of the joint illustrated in FIG. 4.

Before explaining at least one embodiment of the invention in detail, it is to be understood that the invention is not limited in its application to the details of construction and the arrangements of components set forth in the following description or illustrated in the drawings. The invention is capable of other embodiments and of being practiced or carried out in various ways. Also, it is to be understood that the phraseology and terminology employed herein is for the purposes of description and should not be regarded as limiting.

DESCRIPTION OF THE PREFERRED EMBODIMENT

A lost foam pattern cluster 10 for use in forming metal castings is illustrated in FIGS. 1 through 5. As is well known, lost foam patterns are fabricated of a plastic, such as polystyrene, which vaporizes upon contact with molten metal. In this embodiment, the lost foam pattern cluster 10 comprises a plurality of lost foam patterns 14, a runner 18, and an attached sprue 22.

While various constructions can be employed, in this embodiment, the runner 18 is in the form of a first lost foam or polystyrene elongated piece which includes a plurality of tapered inner surfaces 26, each tapered inner surface defining a recess or indentation 30. Each of the tapered inner surfaces 26 is generally conical (see FIG. 5) and has about a five degree taper. The indentations 30 are spaced apart and are located to receive portions of the lost foam patterns 14, as hereinafter described.

Means is also provided for attaching the patterns 14 to the runner 18. While various constructions can be employed, in this embodiment, such means comprises each of the patterns 14 including three spaced pieces 33, 34 and 35. More specifically, as illustrated in FIG. 1, the piece 33 extends from the top of the pattern 14 and then over to the runner 18, and the pieces 34 and 35 extend from the side of the pattern 14 to the runner 18. Joints are formed between each pattern 14 and the runner 18 by each piece including an end portion 38 received in one of the recess or indentations 30 in the runner 18. Each end portion 38 has an outer surface 42 which is generally conical (see FIG. 5) and which includes a five degree taper. Each of the end portions 38 is fixedly located in the respective recess or indentation 30 solely by virtue of frictional engagement between the end portion outer surface 42 and the tapered inner surface 26.

The patterns 14 are attached to the runner 18 in the following manner. The end portions 38 of the pieces 33, 34, and 35 extending from the patterns 14 are aligned with the appropriate indentations 30 in the runner 18. Each of the end portions 38 is then forced into the respective one of the indentations 30 to the point where the tapered outer surface 42 of the end portions 38 is in frictional engagement with the tapered inner surfaces 26 defining the indentations 30. As a result, the end portions 38 are fixedly located in the indentations 30 in the runner 18 solely by virtue of this frictional engagement and without the need for hot knives, hot melt adhesives, or solvents. The assembly can be accomplished quickly and without the safety hazards associated with other assembly methods. The conical shape of the end portions 38 causes the portions to be uniformly stressed thereby uniformly circumferentially sealing the end portion outer surface 42 in the runner 18 and preventing any casting flaws. The resilient polystyrene foam provides a normal force and a coefficient of friction which retains the end portion 38 in the runner 18.

While the disclosed construction employs recesses or indentations 30 on the runner 18 and end portions 38 on the pattern 14, the runner 18 could include the end portions and the patterns 14 could include the recesses or indentations.

Various of the features of the invention are set forth in the following claims.

I claim:

1. A lost foam pattern including a first lost foam piece having a tapered inner surface defining an indentation, and a second lost foam piece received in said indentation and having a tapered outer surface in frictional engagement with said tapered inner surface, said first lost foam piece and said second lost foam piece being fixedly connected solely by virtue of said frictional engagement.

2. A lost foam pattern in accordance with claim 1 wherein said tapered inner surface and said tapered outer surface each have about a five degree taper.

3. A lost foam pattern in accordance with claim 1 wherein said tapered inner surface and said tapered outer surface are generally conical.

4. A lost foam pattern cluster including a lost foam runner having a plurality of tapered inner surfaces, each tapered inner surface defining an indentation, and a plurality of lost foam patterns, each pattern including a portion received in one of said indentations and having a tapered outer surface in frictional engagement with said tapered inner surface, said runner and said patterns being fixedly connected solely by virtue of said frictional engagement.

5. A lost foam pattern cluster in accordance with claim 4 wherein said tapered inner surfaces and said tapered outer surfaces each have about a five degree taper.

6. A lost foam pattern cluster in accordance with claim 4 wherein said tapered inner surfaces and said tapered outer surfaces are generally conical.

7. A lost foam pattern cluster including a lost foam runner having a plurality of tapered inner surfaces, each tapered inner surface defining an indentation, and a like plurality of lost foam patterns, each pattern including a portion received in one of said indentations and having a tapered outer surface in frictional engagement with the associated one of said tapered inner surfaces, said runner and said patterns being fixedly connected solely by virtue of said frictional engagement.

8. A lost foam pattern cluster in accordance with claim 7 wherein said tapered inner surfaces and said tapered outer surfaces each have about a five degree taper.

9. A lost foam pattern cluster in accordance with claim 7 wherein said tapered inner surface and said tapered outer surface are generally conical.

10. A lost foam pattern cluster including a lost foam runner and a plurality of lost foam patterns, one of said lost foam runner and said plurality of lost foam patterns having a plurality of tapered inner surfaces, each tapered inner surface defining an indentation, and the other of said lost foam runner and said plurality of lost foam patterns including a like plurality of portions respectively received in said indentations and having respective tapered outer surfaces in frictional engagement with the respectively associated one of said inner surfaces, said runner and said patterns being fixedly connected solely by virtue of said frictional engagement.

11. A lost foam pattern cluster in accordance with claim 10 wherein said tapered inner surfaces and said tapered outer surfaces have about a five degree (5°) taper.

12. A lost foam pattern cluster in accordance with claim 10 wherein said tapered inner and outer surfaces are generally conical.

13. A method for assembling a lost foam pattern, said method comprising forcing a second lost foam piece having a tapered outer surface into a first lost foam piece having a tapered inner surface defining an indentation to where the tapered outer surface is in frictional engagement with the tapered inner surface and the second lost foam piece is fixedly connected to the first lost foam piece solely by virtue of the frictional engagement.

* * * * *